United States Patent

Kawano et al.

[11] Patent Number: 6,093,917
[45] Date of Patent: Jul. 25, 2000

[54] HIGH FREQUENCY HEATING COIL DEVICE

[75] Inventors: Takayuki Kawano; Takijiro Shimamoto, both of Nagasaki; Masanori Terasaki, Tokyo, all of Japan

[73] Assignee: Mitsubishi Heavy Industries, Ltd., Tokyo, Japan

[21] Appl. No.: 09/186,382

[22] Filed: Nov. 5, 1998

[30] Foreign Application Priority Data

Mar. 23, 1998 [JP] Japan ............................ 10-074122

[51] Int. Cl.⁷ ...................................... H05B 6/38
[52] U.S. Cl. ............................... 219/644; 219/643
[58] Field of Search ..................... 219/644, 643, 219/672, 673, 635, 670, 676

[56] References Cited

U.S. PATENT DOCUMENTS

| | | |
|---|---|---|
| 4,590,347 | 5/1986 | Thatcher et al. ............ 219/644 |
| 5,053,593 | 10/1991 | Iguchi ......................... 219/644 |
| 5,397,876 | 3/1995 | Shimamoto et al. ........ 219/644 |
| 5,523,546 | 6/1996 | Lake . |

FOREIGN PATENT DOCUMENTS

| | | |
|---|---|---|
| 0 848 577 | 6/1998 | European Pat. Off. . |
| 07114984 | 5/1995 | Japan . |

*Primary Examiner*—Mark Paschall
*Assistant Examiner*—Jeffrey Pwu
*Attorney, Agent, or Firm*—Wenderoth, Lind & Ponack, L.L.P.

[57] ABSTRACT

A high frequency heating coil device having sufficient flexibility and heating ability is provided. Coils 2 are contained in outer jacket 1. The coils 2 are made of steel, copper or brass tubing which is annealed sufficiently to be flexible. Plural pieces of magnetic substance 10 are arranged in series between the coils 2. Flexible spacer 9 is arranged between a magnetic substance 10 and the coils 2. Upper and lower end faces of each piece of the magnetic substance 10, make direct contact with other adjacent pieces, and are made with curved faces a. Heating coil device is so constructed that when inserted into a hole of an object to be heated and high frequency current is supplied to the coils to the coils 2 from electric source 6, eddy currents are generated in an inner surface of the hole in order to heat the object. The heating coil device, while being bent to avoid obstructions, can still be inserted into and drawn out of the hole.

8 Claims, 8 Drawing Sheets

HIGH FREQUENCY HEATING COIL DEVICE

BACKGROUND OF THE INVENTION

1. Field of the Invention

The present invention relates to a high frequency heating coil device which is inserted into a slotted hole of an object in order to heat the object. More specifically, the present invention relates to a high frequency heating coil device which is made flexible so as to be inserted easily into the hole of the object to be heated where there is an obstruction.

2. Description of the Prior Art

When a steam turbine casing, or the like, is fastened by a bolt, in order to ensure proper fastening, the bolt is first heated in order to be elongated, and then a nut is fastened. Also, when the steam turbine casing is opened for maintenance inspection, the bolt which fastens the turbine casing is heated in order to be elongated, and then the nut is unfastened.

As a means for heating the bolt, there is a known high frequency heating coil device in which a high frequency current is supplied to a coil. This high frequency heating coil device is formed in a slender bar shape. It is inserted into a slotted hole bored in the bolt along a central axis of the bolt in order to heat the bolt rapidly from its interior.

The high frequency heating coil device is used for the above mentioned bolt but in the steam turbine casing there often exists an obstruction above the bolt. In such a case, a rigid and linearly formed high frequency heating coil device in the prior art, having no flexibility, cannot be inserted into the hole of the bolt.

To solve such a problem, the inventors have previously proposed a high frequency heating coil device Japanese laid-open patent application No. Hei 7-114984) in which, although not shown, a magnetic substance is disposed between conductive tubes, which constitute U-shaped coils. The magnetic substance is sectioned into plural pieces so as to promote flexibility of the coil device. Thereby, if there is an obstruction near a bolt, the entire coil device can be bent in order to be inserted into a hole of the bolt. This also applies to when drawing the coil device out of the hole of the bolt.

In the prior art device mentioned above, however, the magnetic substance is sectioned into plural pieces so that upper and lower end faces of each piece of the magnetic substance are orthogonal to a central axis thereof. Hence, if adjacent end faces make direct contact with each other oblique motion between each piece becomes restricted so that the coil device bends poorly. On the other hand, in order to ensure enough flexibility, it is necessary to provide a gap between each piece of the magnetic substance. If such gap is provided, magnetic flux may leak from the gap and may lower the heating effect of the coil device.

SUMMARY OF THE INVENTION

In order to solve this problem in the prior art, therefore, it is an object of the present invention to provide a high frequency heating coil device, comprising a magnetic substance sectioned into plural pieces which is flexible enough to be easily inserted into a slotted hole of a bolt even if there is an obstruction near the bolt, and which can maintain a sufficient heating effect of the coil device.

In order to attain this object, the present invention provides the following described means (1) to (8).

(1) A high frequency heating coil device comprising a flexible coil bent in a U-shape and arranged in an outer jacket which is made cylindrically of an insulating material. A magnetic substance is arranged between the U-shape of the coil in a longitudinal direction thereof. The magnetic substance is sectioned along the longitudinal direction into plural pieces, and each piece makes direct contact with adjacent pieces. Each piece of the magnetic substance has either end face curved, and each piece makes direct contact with an adjacent piece.

(2) A high frequency heating coil device as mentioned in (1) above, characterized in that each piece of the magnetic substance has its transverse cross sectional shape formed with a width in a direction of curvature of the curved face being smaller than that in an orthogonal direction thereto.

(3) A high frequency heating coil device as mentioned in (2) above, characterized in that there is a spacer made of a flexible and insulating material provided between a side face along the orthogonal direction of the magnetic substance and the coil.

(4) A high frequency heating coil device as mentioned in (3) above, characterized in that the U-shaped coil is a hollow tube, and that the coil device consists of a plurality of sets of coils, each set forming a pair of coils, arranged in a circular shape along an inner wall of the outer jacket.

(5) A high frequency heating coil device comprising a flexible coil bent in a U-shape and arranged in an outer jacket which is made cylindrically of an insulating material. A magnetic substance is arranged between the U-shape of the coil in a longitudinal direction thereof, and the magnetic substance consists of magnetic particles contained in a flexible container.

(6) A high frequency heating coil device as mentioned in (5) above, characterized in that the container has its transverse cross sectional shape formed in an oblong shape in which one width is smaller than the other.

(7) A high frequency heating coil device as mentioned in (6) above, characterized in that there is provided a spacer made of a flexible and insulating material between a side face, width thereof being larger than the other, of the container and the coil.

(8) A high frequency heating coil device as mentioned in (7) above, characterized in that the U-shaped coil is made of a hollow tube and consists of a plurality of sets of coils. Each set is formed by a pair of coils. The sets of coils are arranged in a circular shape along an inner wall of the outer jacket.

Generally, a high frequency heating coil device is inserted into a hole of an object to be heated, for example a bolt. A high frequency current is supplied to the coil to heat the bolt rapidly. Thus, the bolt is thermally elongated so that fastening force of a nut is weakened. Unfastening of the nut becomes easy. Conversely, while the bolt is heated, the nut can be fastened so that the fastening force of the bolt is ensured.

In the high frequency heating coil device of means (1) above, even in the case where there is an obstruction in the work place and a linearly formed coil device cannot be inserted into the hole of the object to be heated, the outer jacket and coil can be flexibly bent. The magnetic substance is sectioned into plural pieces so that each piece of it makes direct contact with adjacent pieces via the curved faces and can be bent freely along the curved faces. Thereby, the whole high frequency heating coil device of the present invention can be bent freely to avoid obstructions in order to be inserted into and removed from the hole. Also, the magnetic substance is arranged so that each piece contacts with each other so as to prevent gapping between the pieces. Thereby, leakage of magnetic flux is prevented and the object to be heated can be heated efficiently.

In means (2) above, the width in the direction of curvature of the curved face is made smaller than that in the orthogonal direction. Thereby, the magnetic substance can be bent easily along the curved faces. If the high frequency heating coil device is bent in the direction along the curved faces for each piece of magnetic substance, the entire coil device can be bent easily.

In means (3) above, the spacer is between the magnetic substance and the coil. Thereby, the magnetic substance and the coil are prevented from making direct contact, and the U-shaped coil can be appropriately arranged relative to the outer jacket.

In means (4) above, the U-shaped coil is made of a tube with a comparatively small diameter so as to be bent easily. The plurality of coils are arranged in a circular shape along the inner wall of the outer jacket by the spacer. Thereby, the coils are arranged uniformly along the inner wall of the outer jacket and the object to be heated can be heated uniformly along the inner wall of the hole of the object.

In means (5) above, the magnetic substance consists of magnetic particles, which are contained in the flexible container. Thereby, the magnetic substance itself can be bent freely. The whole high frequency heating coil device can be bent freely in order to avoid the obstruction and can be inserted into the hole of the object as well as can be drawn out of the hole, like in means (1) above.

In means (6) above, the container which contains the magnetic particles has its traverse cross sectional shape formed in the oblong shape. Thereby, if the high frequency heating coil device is bent in the direction having the smaller width, it can be bent easily and inserted more smoothly into the hole of the object to be heated.

In means (7) above, the spacer enhances the insulating ability between the magnetic substance and the coil. The U-shaped coil can be arranged appropriately relative to the outer jacket, like in means (3) above.

In means (8) above, the coil is made of a tube with a small diameter so as to be bent easily. The plurality of coils are arranged in a circular shape along the inner wall of the outer jacket by the spacer, like in means (4) above. Thereby, the coils are arranged uniformly along the inner wall of the outer jacket and the object can be heated uniformly along the inner wall of its hole.

BRIEF DESCRIPTION OF THE DRAWINGS

FIG. 3 is a perspective view of a magnetic substance, in which

DESCRIPTION OF THE PREFERRED EMBODIMENTS

Figure 1:
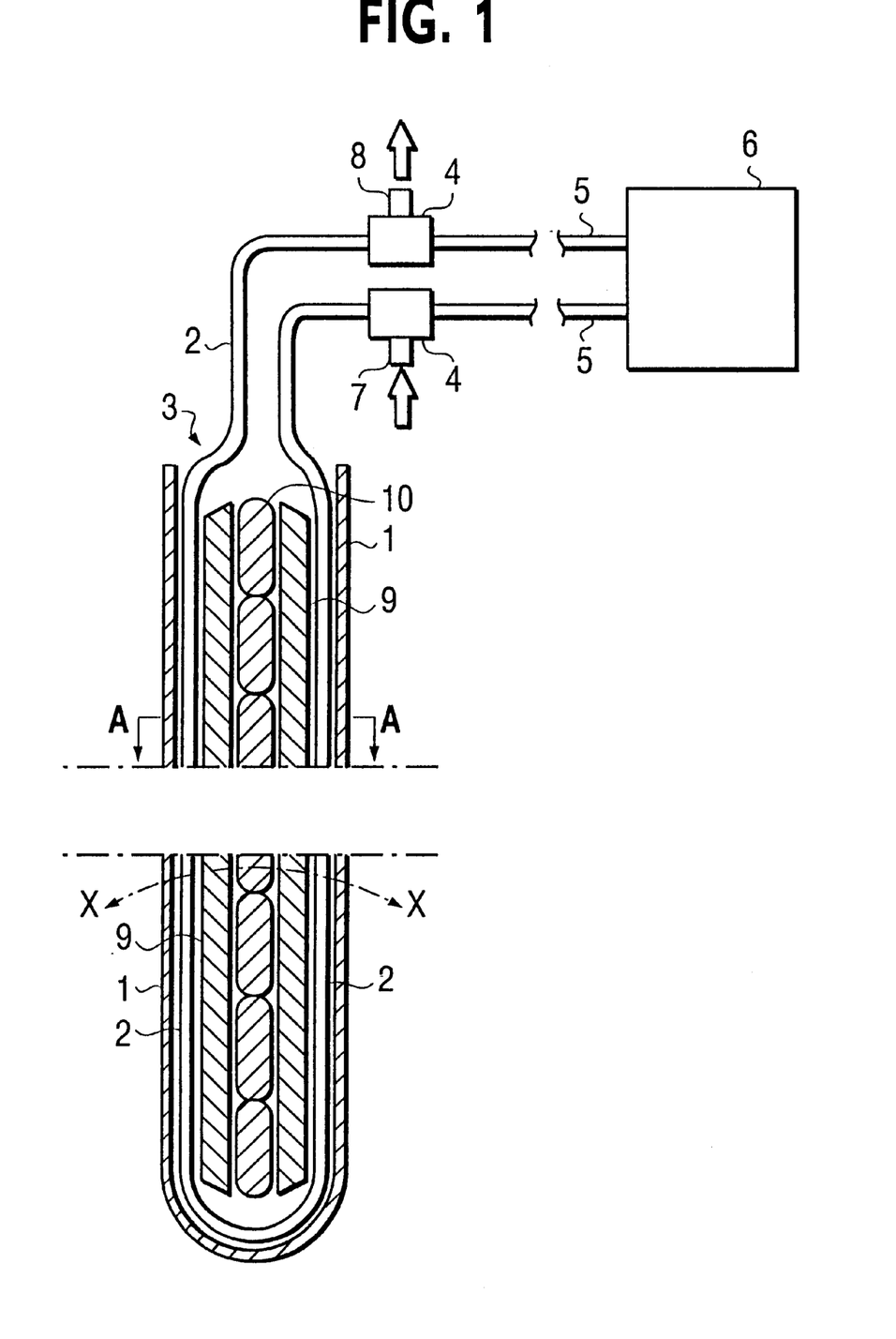
FIG. 1 is a longitudinal cross sectional view of a high frequency heating coil device of a first embodiment of the present invention.
Figure 2:
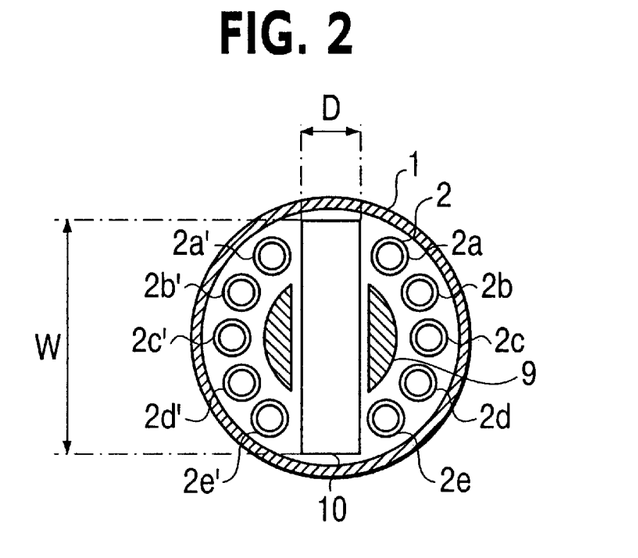
FIG. 2 is a cross sectional view along line A—A of FIG. 1.
Figure 3A:
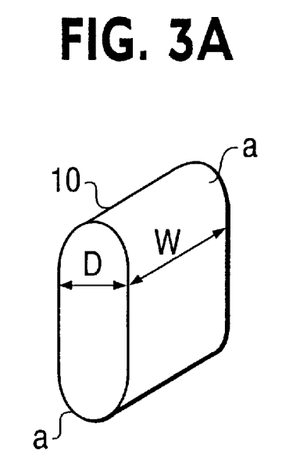
FIG. 3(a) shows one piece of the magnetic substance arranged longitudinally and FIG. 3(b) shows two pieces of the magnetic substance being bent with respect to each other.
Figure 3B:
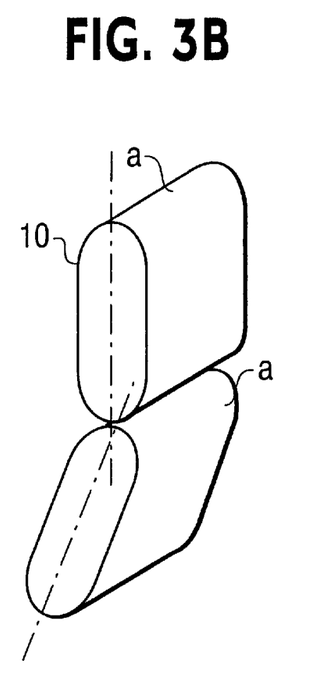

A description of the embodiments according to the present invention with reference to figures will be made. FIG. 1 is a longitudinal cross sectional view of a high frequency heating coil device of a first embodiment. FIG. 2 is a cross sectional view taken along line A—A of FIG. 1. FIG. 3 is a perspective view of a magnetic substance, in which FIG. 3(a) shows one piece of the magnetic substance arranged longitudinally, and FIG. 3(b) shows two pieces of the magnetic substance being bent with respect to each other.

In FIGS. 1 and 2, an outer jacket 1 is an elongated hollow body made of a flexible, heat resistant and insulating material, for example polytetafluoroethylene or the like. Within the outer jacket 1, a plurality of coils 2 are inserted, each being bent in a U-shape. In the present embodiment, as shown in a cross section of FIG. 2, five coils are arranged in a circular shape within the outer jacket 1. Each coil forms a pair of sectioned tubes 2a and 2a', 2b and 2b', 2c and 2c', 2d and 2d' and 2e and 2e'. The coil 2 is flexible so that it can be bent sufficiently. The coil 2 is made from a hollow tube of steel, copper or brass which is annealed enough in order to be flexible.

Both upper end portions of the coil 2 are elongated upwardly from an upper end opening portion 3 of the outer jacket 1 and are connected at the end portions to electrodes 4. The electrodes 4 are connected to an electric source 6 via flexible cables S. The electric source 6 supplies the coil 2 with a high frequency current. At one of the electrodes 4, there is a water supply portion 7, and at the other electrode there is a drain portion 8. Cooling water is supplied into the coil 2 from the water supply portion 7, and flows through the coil 2 for cooling and is drained from the drain portion 8.

Plural pieces of magnetic substance 10 are disposed in a vertical direction between the coils 2 which are bent in a U-shape. Also, a spacer 9 is disposed in the vertical direction between the coils 2 and the magnetic substance 10. The spacer 9 is made of a flexible, heat resistant and insulating material, such as heat resistant plastics which can be Teflon or the like. The spacer 9 functions as a filler for arranging the plurality of coils 2a and 2a', 2b and 2b', 2c and 2c', 2d and 2d', and 2e and 2e' in a circular shape along an inner wall of the outer jacket 1. Multiple of pieces of the magnetic substance 10 are arranged in a longitudinal direction within the coils 2. Each piece of the magnetic substance 10 has its upper end face and lower end face formed in curved faces a respectively, as shown in FIG. 3(a).

Each piece of the magnetic substance 10 is arranged in a longitudinal direction of the coils 2. Each piece has its upper end face and lower end face being in direct contact with other adjacent pieces of the magnetic substance 10. Also, in a transverse or horizontal cross section of each piece of the magnetic substance 10, a width D in a direction of curvature of the curved face a, as shown in FIG. 3(a), is smaller than a width W in an orthogonal direction.

Accordingly, each piece of the magnetic substance 10 can be arranged into a bent form with respect to each other, as shown in FIG. 3(b). Thus, the present high frequency heating coil device can be bent sufficiently in the direction along the curvature of the curved face a (in a direction as shown by arrow X in FIG. 1). Also, the number of pieces in the magnetic substance 10 can be changed easily in order to adjust for the length of the coils 2.

Figure 4:
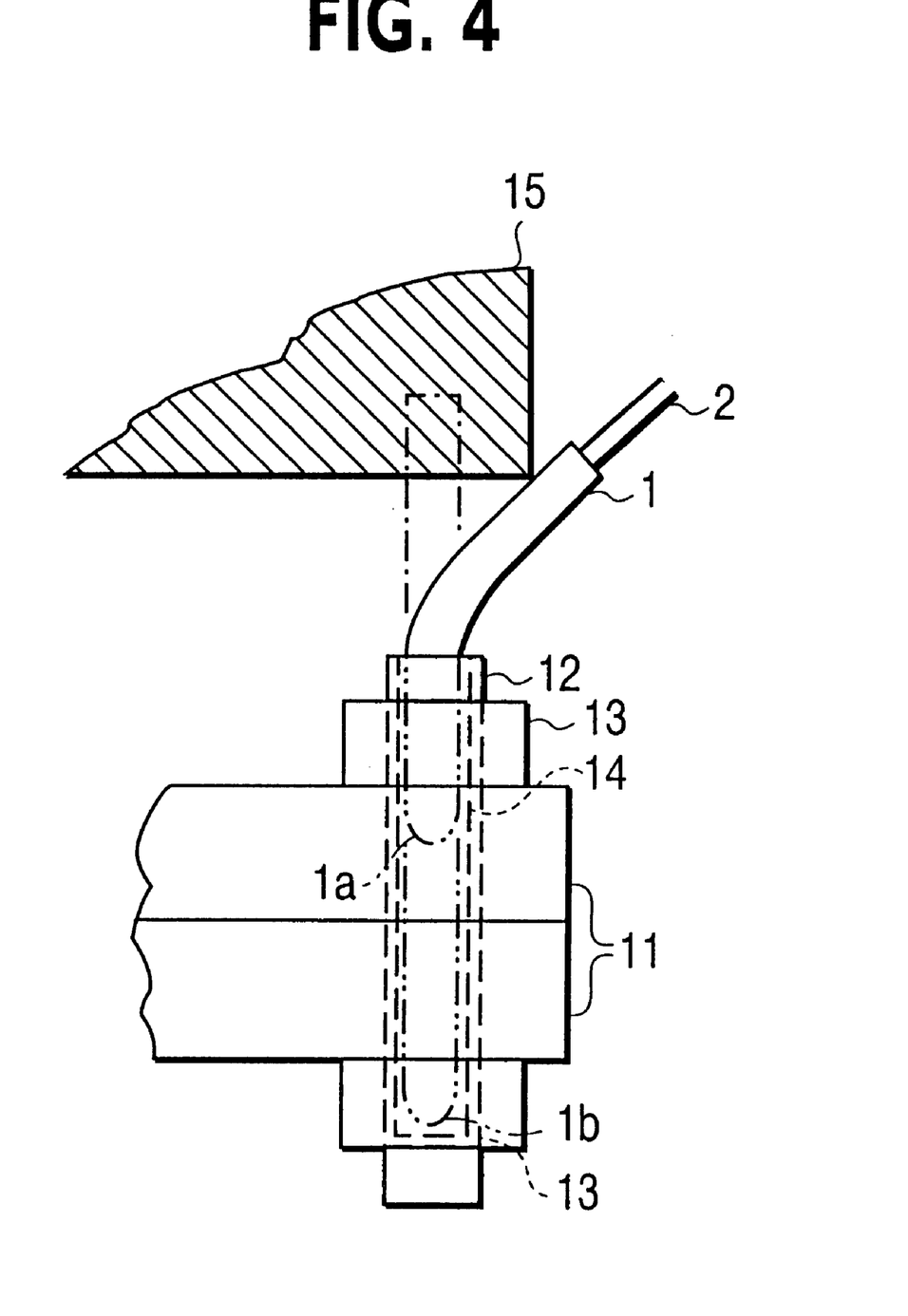
FIG. 4 is a side view showing the high frequency heating coil device of the first embodiment in a process of being inserted into a hole of a bolt.

The high frequency heating coil device of the first embodiment can be easily inserted into the hole of the object to be heated even in cases where there is an obstruction right above the object to be heated. FIG. 4 is a side view showing the high frequency heating coil device of the first embodiment being inserted into the hole of the bolt which fastens flanges 11. Flanges 11 are fastened by bolt 12 and nuts 13. A hole 14 is bored in the bolt 12. Right above the bolt 12, there exists an obstruction 15 which will obstruct an inflexible high frequency heating coil device.

The high frequency heating coil device according to the present invention consists of the outer jacket 1 and the spacer 9, but both are made of a flexible and insulating material. The high frequency coil device, also, consists of the coils 2 made of flexible small diameter tubes of copper, brass or the like. Hence, as shown in FIG. 4, the high frequency heating coil device at its front end is inserted gradually into the hole 14 of the bolt 12. A portion of the coil device hits the obstruction 15 right above the bolt 12, and the device is bent to avoid the obstruction 15. The outer jacket 1 can be completely inserted to a bottom of the hole 14 as shown by positions 1a to 1b in FIG. 4. In this case, each piece of the magnetic substance 10 is arranged to make direct contact with adjacent ones as shown in FIG. 3(b). Each piece is bent with respect to each other so as to conform to a curvature of the outer jacket 1 and the spacer 9.

Figure 5:
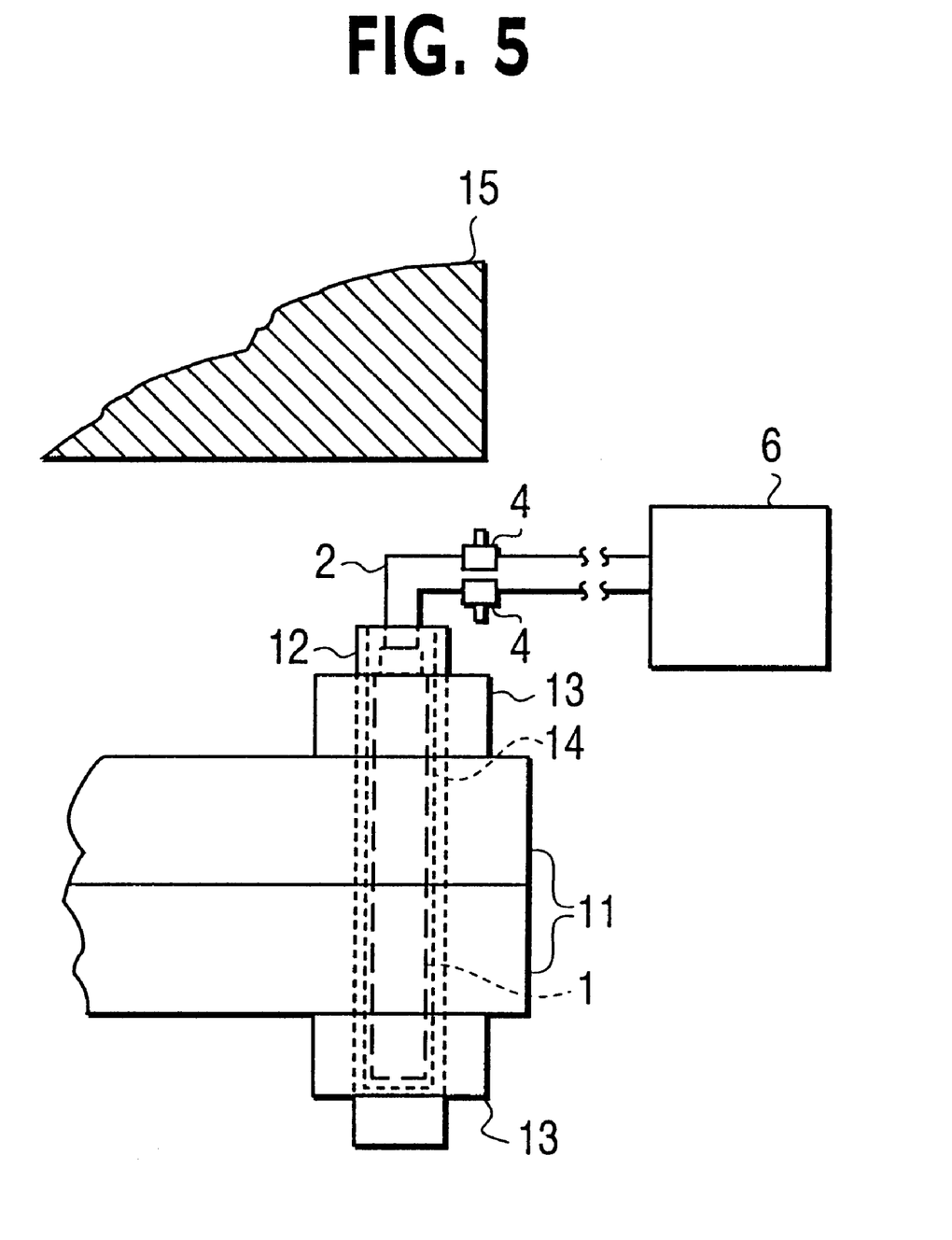
FIG. 5 is a side view showing the bolt of FIG. 4 being heated by the high frequency heating coil device of the first embodiment.

FIG. 5 is a view showing the bolt 12 being heated by the high frequency heating coil device which has been inserted completely into the hole 14 bored along a central axis of the bolt 12. A high frequency current is supplied to the coils 2 from the electric source 6 via the electrodes 4. An eddy current occurs in an inner surface of the hole 14 and thereby, the bolt 12 is heated rapidly. At the same time, cooling water is supplied into the coils 2 from the water supply portion 7 and is drained from the drain portion 8. Thereby, the coils 2 are prevented from being overheated.

The high frequency heating coil device mentioned above has enough flexibility and even if there is an obstruction right above the bolt 12, the coil device can be bent freely in order to be inserted into the hole 14 of the bolt 12. Likewise, the coil device can be drawn out of the hole 14.

Figure 6:
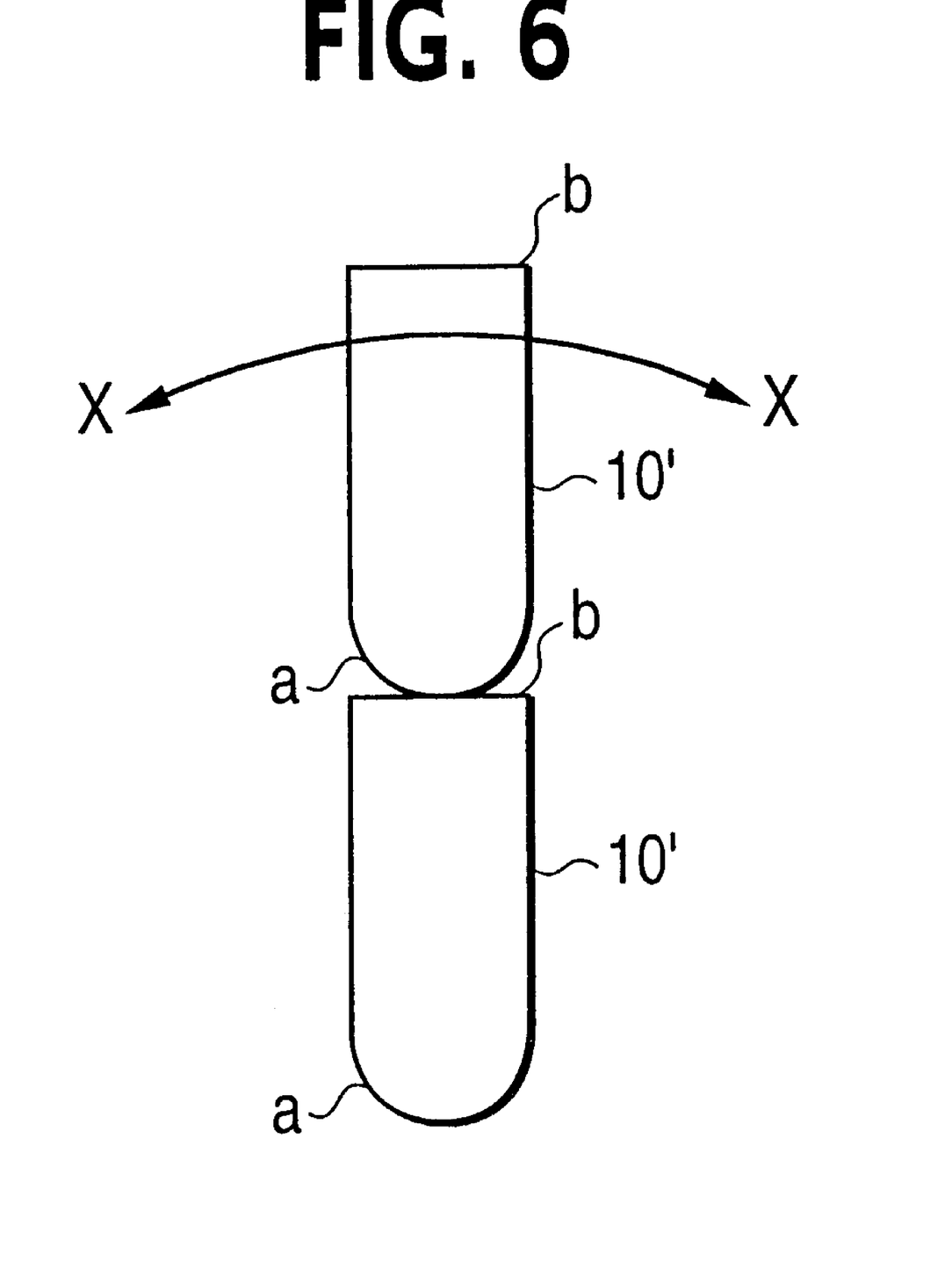
FIG. 6 is a side view of another example of the magnetic substance of the high frequency heating coil device of the first embodiment.

FIG. 6 is a side view of another example of a magnetic substance 10' of the high frequency heating coil device of the first embodiment. In the present example, each piece of magnetic substance 10' has a lower end curved face and an upper end flat face b. Other parts of the construction are the same as those in FIGS. 1 and 2. Even if these shaped pieces are used, the magnetic substance 10' as a whole can be bent freely in a direction indicated by arrow X. Thus, a high frequency heating coil device using such pieces of the magnetic substance 10' can be bent freely. The end faces of adjacent pieces make direct contact with each other. At least one end face has a curved face, and thereby the high frequency heating coil device can be bent freely.

Figure 7:
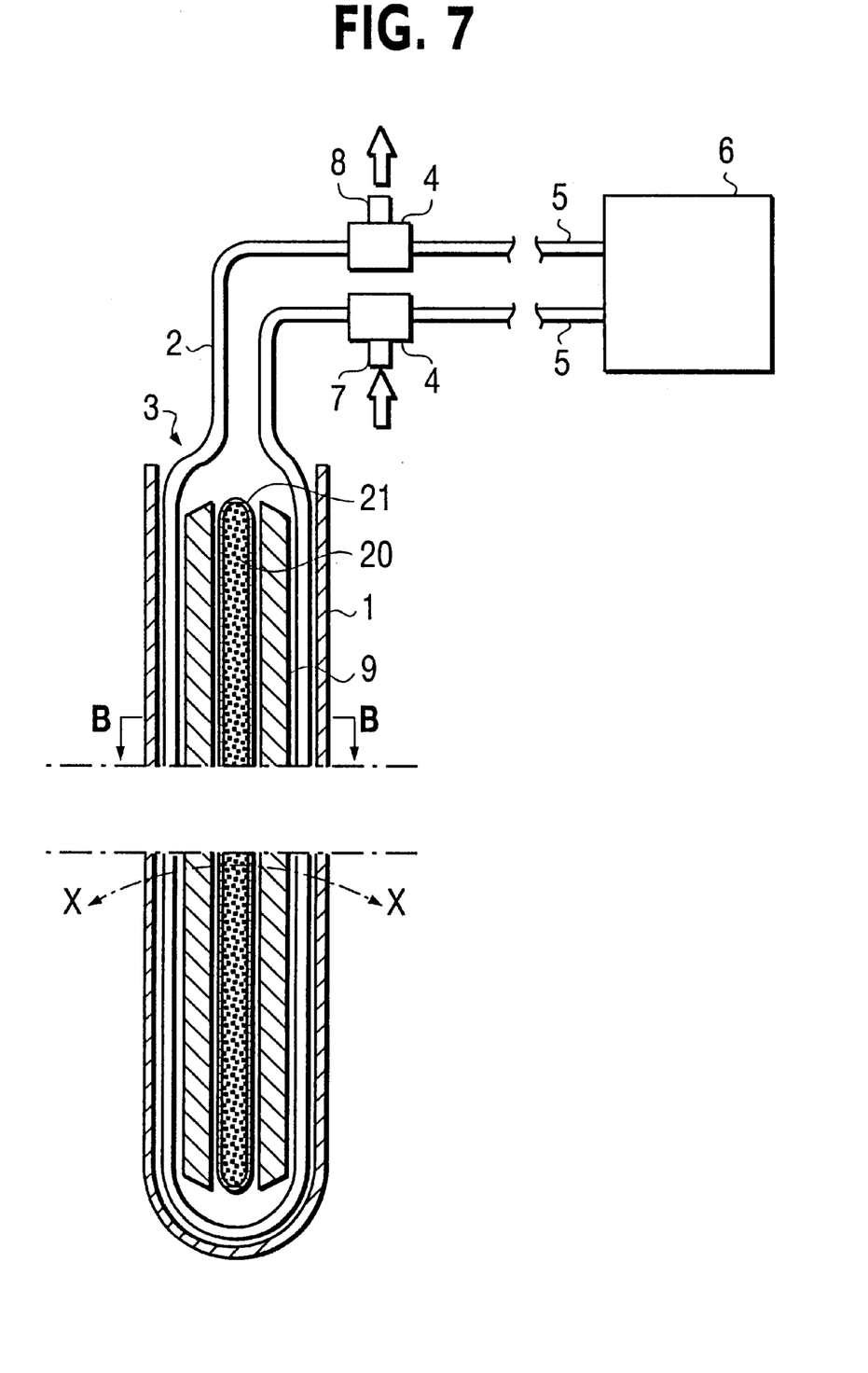
FIG. 7 is a longitudinal cross sectional view of a high frequency heating coil device of a second embodiment according to the present invention.
Figure 8:
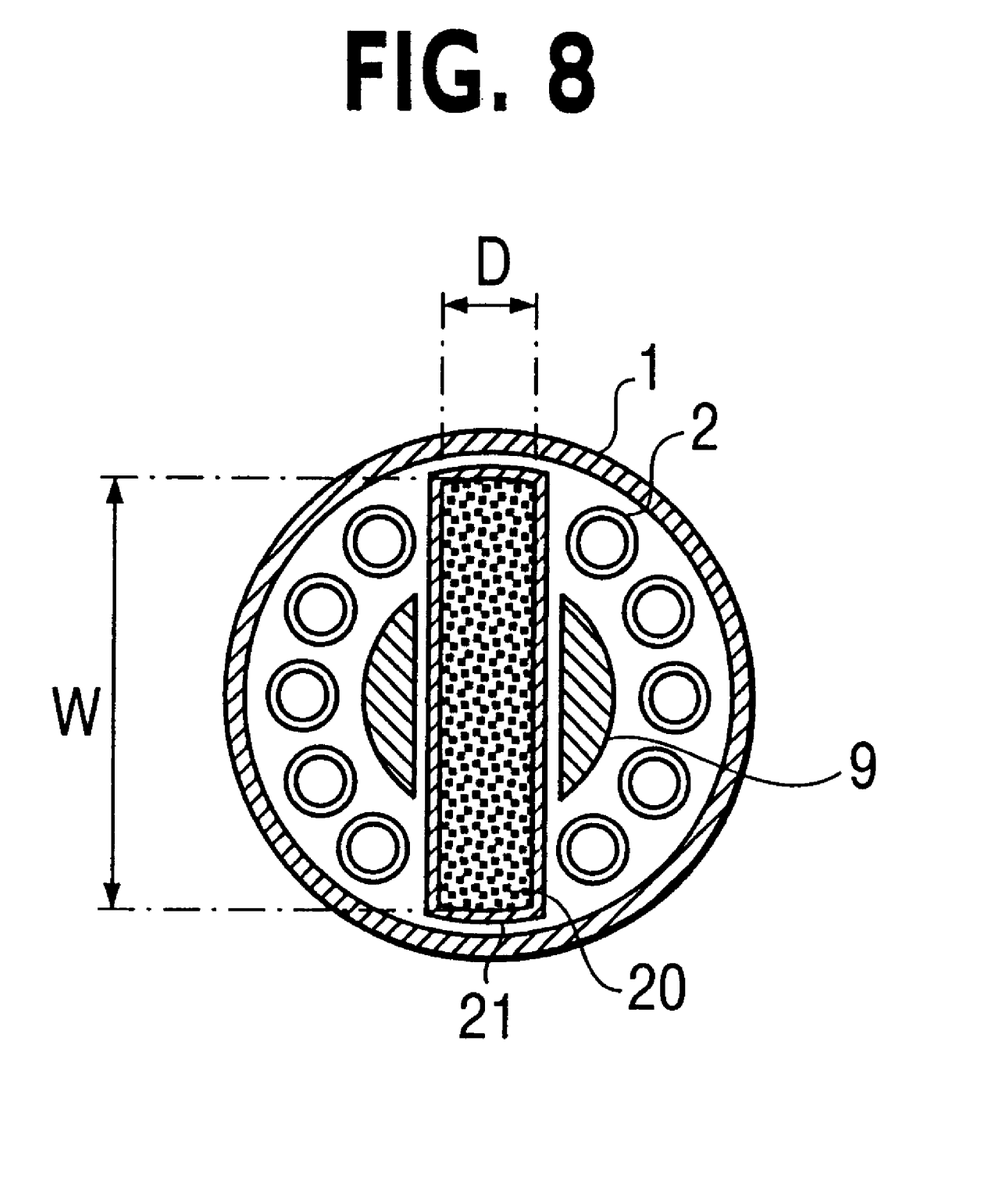
FIG. 8 is a cross sectional view along line B—B of FIG. 7.

FIG. 7 is a longitudinal cross sectional view of a high frequency heating coil device of a second embodiment according to the present invention. FIG. 8 is a cross sectional view taken along line B—B of FIG. 7. In this second embodiment, in place of the plurality of pieces of the magnetic substance 10 of the first embodiment, magnetic particles 20 are used. The magnetic particles 20 are contained in a container 21 which is elongated in the longitudinal direction of the coils 2. The container 21 is made of a flexible and heat resistant material. One width D of a transverse or horizontal cross section of the container 21 is made smaller than the other width W thereof, as shown in FIG. 8. Hence, the container 21 can bend freely in a direction of the smaller width D as shown by arrow X in FIG. 7. Other parts of the construction are the same as those of the first embodiment.

The high frequency heating coil device of the second embodiment is used the same as that of the first embodiment. While the coil device is being bent, it is inserted into the hole 14 and can be drawn out of the hole 14 of the bolt 12. Also, according to the second embodiment, a shape of the container 21 can be changed. A form of the transverse cross section of the magnetic substance consisting of the magnetic particles 20 also can be changed and the same effects that mentioned with respect to the first embodiment can be obtained.

Figure 9:
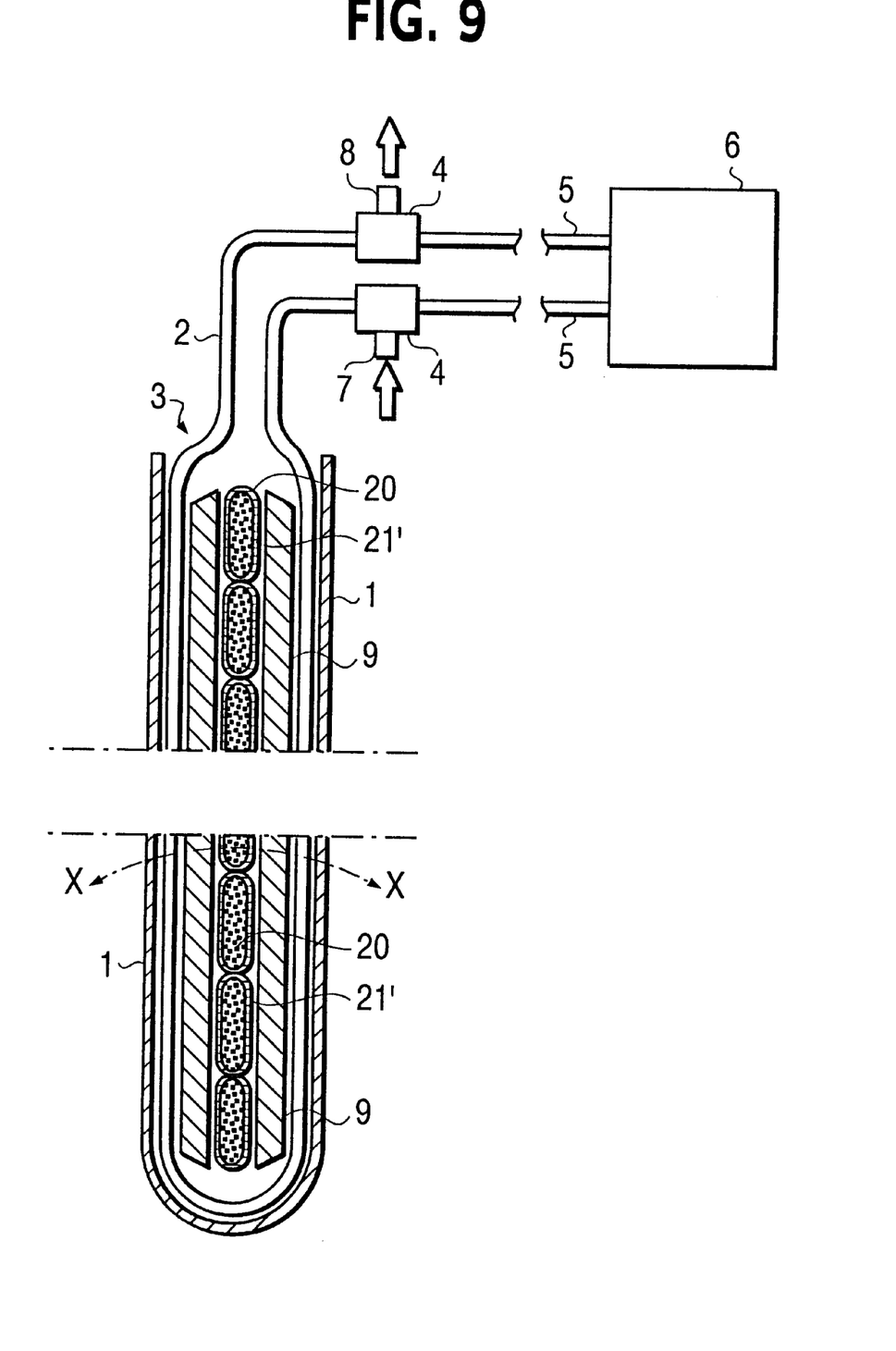
FIG. 9 is a longitudinal cross sectional view of another example of the high frequency heating coil device of the second embodiment.

FIG. 9 is a longitudinal cross sectional view of another example of the high frequency heating coil device of the second embodiment of the present invention. In FIG. 9, the container 21 contains the magnetic particles 20. The container 21 is sectioned into plural pieces to form respective units of container 21'. By use of these units, the number of pieces can be easily changed so as to correspond to the length of the coils 2.

It is understood that the invention is not limited to the particular construction and arrangement herein illustrated and described, but embraces such modified forms thereof as come within the scope of the following claims.

What is claimed is:

1. A high frequency heating coil device, comprising:
   an outer jacket having a cylindrical shape and comprising an insulating material;
   at least one flexible coil having a U-shape and being located inside said outer jacket;
   a magnetic substance arranged in a longitudinal direction within said U-shape of said at least one flexible coil; and
   wherein said magnetic substance is sectioned into plural pieces, each of said plural pieces having at least one curved end face in direct contact with another of said plural pieces adjacent thereto.

2. The high frequency heating coil device of claim 1, wherein each of said plural pieces has a transverse cross sectional shape having a first width along a first direction which is in a direction of curvature of said curved end face and a second width along a second direction perpendicular to said first direction, wherein said first width is smaller than said second width.

3. The high frequency heating coil device of claim 2, wherein said magnetic substance has a side face extending in said second direction, and wherein a spacer is disposed between said at least one flexible coil and said side face of said magnetic substance.

4. The high frequency heating coil device of claim 3, wherein said at least one flexible coil comprises a plurality of flexible coils, each having a U-shape; and
   wherein said flexible coils are arranged in a circular shape along an inner wall of said outer jacket.

5. The high frequency heating coil device of claim 4, wherein said flexible coils comprise hollow tubes.

6. A high frequency heating coil device, comprising:
   an outer jacket having a cylindrical shape and comprising an insulating material;
   at least one flexible coil having a U-shape and being located inside said outer jacket; and a flexible container containing magnetic particles of a magnetic substance and said flexible container being arranged in a longitudinal direction within said U-shape of said at least one flexible coil;

wherein said flexible container has an oblong transverse cross sectional shape having a first width along a first direction and a second width along a second direction perpendicular to said first direction, wherein said first width is smaller than said second width; and wherein said flexible container has a side face extending in said second direction, and wherein a spacer is disposed between said at least one flexible coil and said side face of said flexible container.

7. The high frequency heating coil device of claim 6, wherein said at least one flexible coil comprises a plurality of flexible coils, each having a U-shape; and wherein said flexible coils are arranged in a circular shape along an inner wall of said outer jacket.

8. The high frequency heating coil device of claim 7, wherein said flexible coils comprise hollow tubes.

* * * * *